United States Patent Office 3,841,965
Patented Oct. 15, 1974

3,841,965
METHOD OF, AND APPARATUS FOR, SUPPORTING THE MODERATOR STRUCTURE OF A NUCLEAR REACTOR
Rolf Degen and Max Zimmermann, Untersiggenthal, Switzerland, assignors to BBC Brown Boveri & Company Limited, Baden, Switzerland
Filed Aug. 24, 1972, Ser. No. 283,286
Claims priority, application Switzerland, Oct. 15, 1971, 15,096/71
Int. Cl. G21c 5/06, 5/10
U.S. Cl. 176—87
4 Claims

ABSTRACT OF THE DISCLOSURE

The moderator assembly of a gas-cooled nuclear reactor is supported by a replaceable supporting structure.

---

Figure 1:
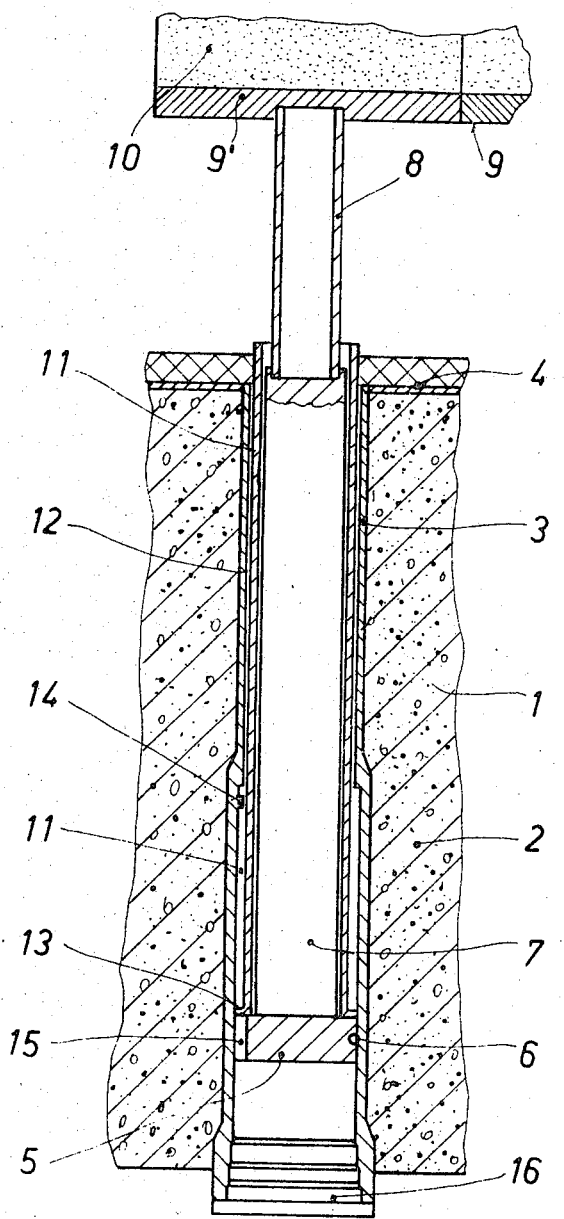

The invention relates to nuclear reactor art, and is concerned with the provision of a method of supporting the moderator structure in the reactor vessel of a gas-cooled graphite-moderated, nuclear reactor having vertical adjacent columns composed of blocks, the columns resting on a sectional mounting plate the sections of which are supported by at least one support tube on the bottom of the reactor vessel, such that the support tubes pass through the bottom of the reactor vessel and are provided at the outer end with at least one plug which acts as a radiation shield and a cooling-gas seal.

Methods of supporting the moderator structure of nuclear reactors cooled by compressed gas are known whereby single or several vertical moderator columns composed of blocks standing on base plates comprising sectional elements are supported by means of posts on the bottom of the reactor vessel. Owing to the effects of heat occurring between the operating and shutdown conditions, centering and adjusting devices, and also thermal insulation, are required to ensure that the individual base plates maintain the lattice structure of the moderator assembly during almost all operating conditions.

The supporting structure is designed for the whole life of the reactor, and furthermore the lattice structure must be maintained irrespective of deformation of the supports themselves. This means that the supporting structure has to be oversized and, on the other hand, that the cost of achieving a technically practicable solutions is disproportionately high. The reason for this is that in the event of damage the supporting structure can be repaired only after the whole moderator assembly has been removed, although stresses on the support structure caused by the incoming and outgoing gas, and the associated vibration, have resulted in damage.

A principal object of the present invention is to eliminate the disadvantages stated and to create a supporting structure which affords adequate safety in gas-cooled nuclear reactors, using simple technical means.

The foregoing, and other, objects are achieved by fixing the support tube in a sleeve tube by means of a locking plate such that between the support tube and the sleeve tube there is an annular gap containing an auxiliary tube which can move in the axial direction of the support tube and which while the reactor is in operation is supported on the locking plate, and while the reactor is shut down is supported on the sleeve tube by means of a pawl device, the length of travel of the auxiliary tube being such that when the pawl device is in operation the support tube is at least partially relieved of the weight of the moderator column.

The advantages of the invention flow from the fact that the supporting structure can be replaced, the cost being kept to a minimum through the use of simple components. In view of the high activity of the moderator assembly, the absence of any danger when changing the supporting structure is a further and important advantage in the interest of the safety of a nuclear reactor installation. Also, expensive shutdown times for repair purposes are greatly shortened compared with former methods, and a shielded store for the components and fuel assemblies of the reactor core during repairs can be dispensed with. Decontamination operations during replacement of the supporting structure are also greatly reduced.

Another advantage of the invention lies in the fact that the choice of materials for the reactor core support structure is simpler because they can be replaced as necessary. This feature is particularly important in view of the tendency towards higher temperatures for nuclear reactors which improve the overall plant efficiency, because the long-term thermal resistance properties are of less significance.

Figure 2:
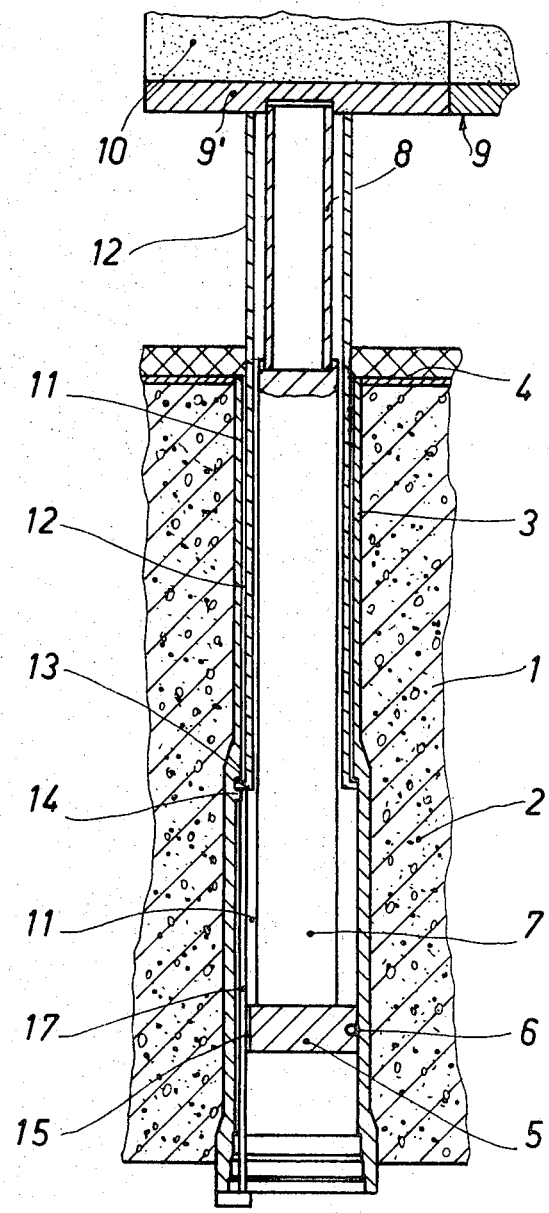

The invention will now be explained in more detail and with reference to the appended drawings, in which FIG. 1 is a section through the support device while the reactor is in operation; and FIG. 2 is a section through the support device while the reactor is shut down.

FIG. 1 shows a section of a gas-cooled, graphite-moderated, reactor vessel 1, the bottom 2 of which is penetrated by a sleeve tube 3. The side facing the reactor core is provided with a liner 4 which protects the concrete of reactor vessel 1 against the direct effects of heat, and also forms a sealing skin. Sleeve tube 3 has fixed in it a locking plate 5, balls 6, for example, being used to hold the locking plate against the sleeve tube. Locking plate 5 is rigidly attached to a column 7 which becomes the actual support tube 8. Support tube 8 forms the support for the mounting plate 9, or for its sections 9', on which the individual moderator blocks 10 of the reactor core rest. Between sleeve tube 3 and column 7 or support tube 8 there is provided an annular gap 11 which contains an auxiliary tube 12. When the reactor is in operation, as shown in FIG. 1, this auxiliary tube 12 stands with its collar 13 on locking plate 5 and extends through the reactor vessel wall 1 and liner 4.

Annular gap 11 includes a constriction coupled with a pawl device 14 in which collar 13 of auxiliary tube 12 can engage. In this way auxiliary tube 12 can be supported on sleeve tube 3. Locking plate 5 is provided with at least one hole 15 which is at least partly covered by the collar 13 of auxiliary tube 12 when in the rest position.

At the outer end of sleeve tube 3 there is a plug 16 for sealing and shielding the cooling gas. The plug is preferably made in two parts so that, should one fail, the other still provides sufficient security against radiation leakage and loss of cooling gas.

FIG. 2 shows the same construction as that of FIG. 1, corresponding reference numerals being used for the same parts. The difference between the two figures is that in FIG. 2 the auxiliary tube 12 is shown in the raised position and supports mounting plate 9 or one of its sections 9'. To attain this position, when the reactor has been shut down plug 16 is removed and a rod 17 is introduced through hole 15 to engage collar 13 of auxiliary tube 12. Rod 17 is then raised by a jacking system (not shown) until collar 13 of auxiliary tube 12 engages in pawl device 14. At the same time, the load on support tube 8 and column 7 is relieved so that column 7 and support tube 8, together with locking plate 5 (after the same has been released), can be lowered. After column 7 or support tube 8 has been checked or renewed, the support system can be replaced by the procedure described, but in reverse.

The jacking system need not necessarily be mechanical, but can easily be replaced by a hydraulic or pneumatic system. In this case, a piston is provided instead of collar 13, and hole 15 is connected to a pressure-medium supply. The pressure is lowered after auxiliary tube 12 has engaged pawl system 14, and the parts are changed in the manner described.

According to another embodiment rod 17 is replaced by a tubular plunger. In this case, however, instead of the pawl device a means of support for mounting the locking plate must be provided which can simply be joined to the concrete pressure vessel 1. After the locking device has been released, whereupon the catches slide back into recesses, the tubular plunger is passed through the gap between sleeve tube 3 and locking plate 5 and applied to auxiliary tube 12. Fixing the tubular plunger in the raised position can easily be achieved at the flange of sleeve tube 3. When the means of support is released, locking plate 5 and the support tube can be removed for inspection purposes.

A further advantage of the invention is that the auxiliary tube 12 can be partly moved during operation by means of an easily fitted device so as to influence the vibration tendency of the support structure. Only individual support tubes which are at risk during operation could be considered in this respect.

We claim:

1. A method of supporting the moderator structure in the reactor vessel of a gas-cooled graphite-moderated nuclear reactor having vertical adjacent columns composed of blocks, the columns resting on a sectional mounting plate the sections of which are supported by at least one support tube on the bottom of the reactor vessel, according to which the support tubes pass through the bottom of the reactor vessel and are provided at the outer end with at least one plug which acts as a radiation shield and a cooling-gas seal, in which the support tube (8) is fixed in a sleeve tube (3) by means of a locking plate (5, 6) such that between the support tube (8) and the sleeve tube (3) there is an annular gap (11) containing an auxiliary tube (12) which is movable in the axial direction of the support tube (8) and which while the reactor is in operation is supported on the locking plate (5,6), and while the reactor is shut down is supported on the sleeve tube (3) by means of a pawl device (14), the length of travel of the auxiliary tube (12) being such that when the pawl device is in operation the support tube (8) is at least partly relieved of the weight of the moderator column.

2. A method as defined in claim 1 in which locking plate (5) contains at least one hole (15) through which a rod (17) is passed which engages the collar (13) of auxiliary tube (12).

3. A method as defined in claim 1, in which the auxiliary tube (12) is fitted with a ring piston which is located in the annular gap (11) and forms a seal, and the locking plate (5) includes a hole connected to a pressure-medium supply.

4. A method as defined in claim 1, in which a gap is provided between locking plate (5) and sleeve tube (3) in which gap a tubular plunger can be inserted which touches the collar (13) of the auxiliary tube (12), and the pawl device is replaced by a mounting support for the locking plate (5) on the concerte pressure vessel, the tubular plunger being fixed to the flange of the sleeve tube (3).

References Cited
UNITED STATES PATENTS

| | | | |
|---|---|---|---|
| 3,119,746 | 1/1964 | Lemesle et al. | 176—84 X |
| 3,249,505 | 5/1966 | Laurent et al. | 176—87 X |
| 3,206,373 | 9/1965 | Dupuy | 176—84 |
| 3,174,906 | 3/1965 | Rougé | 176—84 X |
| 3,102,089 | 8/1963 | Mission et al. | 176—84 X |

CARL D. QUARFORTH, Primary Examiner

ROGER GAITHER, Assistant Examiner

U.S. Cl. X.R.

176—41, 84